United States Patent
Mikliaev et al.

(10) Patent No.: US 11,796,792 B2
(45) Date of Patent: Oct. 24, 2023

(54) APPARATUS FOR DEFLECTING A LASER RADIATION OR FOR DEFLECTING LIGHT

(71) Applicant: LILAS GmbH, Dortmund (DE)

(72) Inventors: Iouri Mikliaev, Cheljabinsk (RU); Vitalij Lissotschenko, Fröndenberg (DE)

(73) Assignee: LILAS GmbH, Dortmund (DE)

( * ) Notice: Subject to any disclaimer, the term of this patent is extended or adjusted under 35 U.S.C. 154(b) by 167 days.

(21) Appl. No.: 16/259,588

(22) Filed: Jan. 28, 2019

(65) Prior Publication Data

US 2019/0155020 A1 May 23, 2019

Related U.S. Application Data

(63) Continuation of application No. PCT/EP2017/067934, filed on Jul. 14, 2017.

(30) Foreign Application Priority Data

Jul. 28, 2016 (DE) .......................... 102016113978.5

(51) Int. Cl.
*G02B 26/10* (2006.01)
*G02B 26/08* (2006.01)
(Continued)

(52) U.S. Cl.
CPC .......... *G02B 26/105* (2013.01); *B23K 26/064* (2015.10); *G02B 26/0816* (2013.01);
(Continued)

(58) Field of Classification Search
CPC .............. G02B 26/105; G02B 26/0816; G02B 27/0961; G02B 26/10; G02B 26/0875; B23K 26/064; G02F 1/292
See application file for complete search history.

(56) References Cited

U.S. PATENT DOCUMENTS 5,059,008 A 10/1991 Flood et al.
5,600,666 A 2/1997 Hiiro
(Continued)

FOREIGN PATENT DOCUMENTS

| DE | 10308708 A1 | 9/2004 |
| DE | 112005003207 B4 | 10/2014 |
| EP | 2023181 A1 | 2/2009 |

OTHER PUBLICATIONS

Office Action in corresponding Russian Patent Application No. 2019105622, dated Nov. 10, 2020, with English translation.

*Primary Examiner* — Balram T Parbadia
*Assistant Examiner* — Gabriel A Sanz
(74) *Attorney, Agent, or Firm* — Edell, Shapiro & Finnan, LLC

(57) ABSTRACT

An apparatus for deflecting laser radiation comprises: a first lens array comprising a plurality of first lenses arranged next to one another to permit the laser radiation to at least partially pass through the first lens array; a second lens array comprising a plurality of second lenses arranged next to one another to at least partially pass through the second lens array laser radiation that has passed through the first lens array; a rotatable or pivotable first mirror arranged between the first and second lens arrays to deflect in a direction of the second lens array the laser radiation that has passed through the first lens array; and an objective lens to focus laser radiation that has passed through the second lens array into a working plane.

3 Claims, 3 Drawing Sheets

(51) Int. Cl.
  *B23K 26/064* (2014.01)
  *G02B 27/09* (2006.01)
  *G02F 1/29* (2006.01)

(52) U.S. Cl.
  CPC ......... *G02B 26/10* (2013.01); *G02B 27/0961* (2013.01); *G02F 1/292* (2013.01); *G02B 26/0875* (2013.01)

(56) References Cited

U.S. PATENT DOCUMENTS

| | | | | |
|---|---|---|---|---|
| 6,005,682 | A * | 12/1999 | Wu | H04N 3/1587 358/482 |
| 6,264,331 | B1 * | 7/2001 | Sawai | G03B 21/006 353/31 |
| 6,341,136 | B1 | 1/2002 | Hiiro | |
| 6,549,691 | B1 * | 4/2003 | Street | H04Q 11/0005 385/16 |
| 7,548,375 | B2 * | 6/2009 | Lissotschenko | G02B 27/0087 359/619 |
| 2002/0018275 | A1 * | 2/2002 | Huang | G02B 26/10 359/205.1 |
| 2002/0159036 | A1 * | 10/2002 | Yamagishi | G02B 26/123 353/31 |
| 2005/0281102 | A1 * | 12/2005 | Bruland | B23K 26/082 257/E23.15 |
| 2007/0127132 | A1 | 6/2007 | Lissotschenko et al. | |
| 2008/0083886 | A1 * | 4/2008 | Faklis | G02B 27/0905 250/504 R |
| 2009/0002664 | A1 * | 1/2009 | Tanitsu | G02B 3/0068 355/67 |
| 2009/0034042 | A1 | 2/2009 | Tholl et al. | |
| 2009/0059363 | A1 * | 3/2009 | Straehle | G02B 21/22 359/389 |
| 2013/0235255 | A1 | 9/2013 | Westphal et al. | |

* cited by examiner

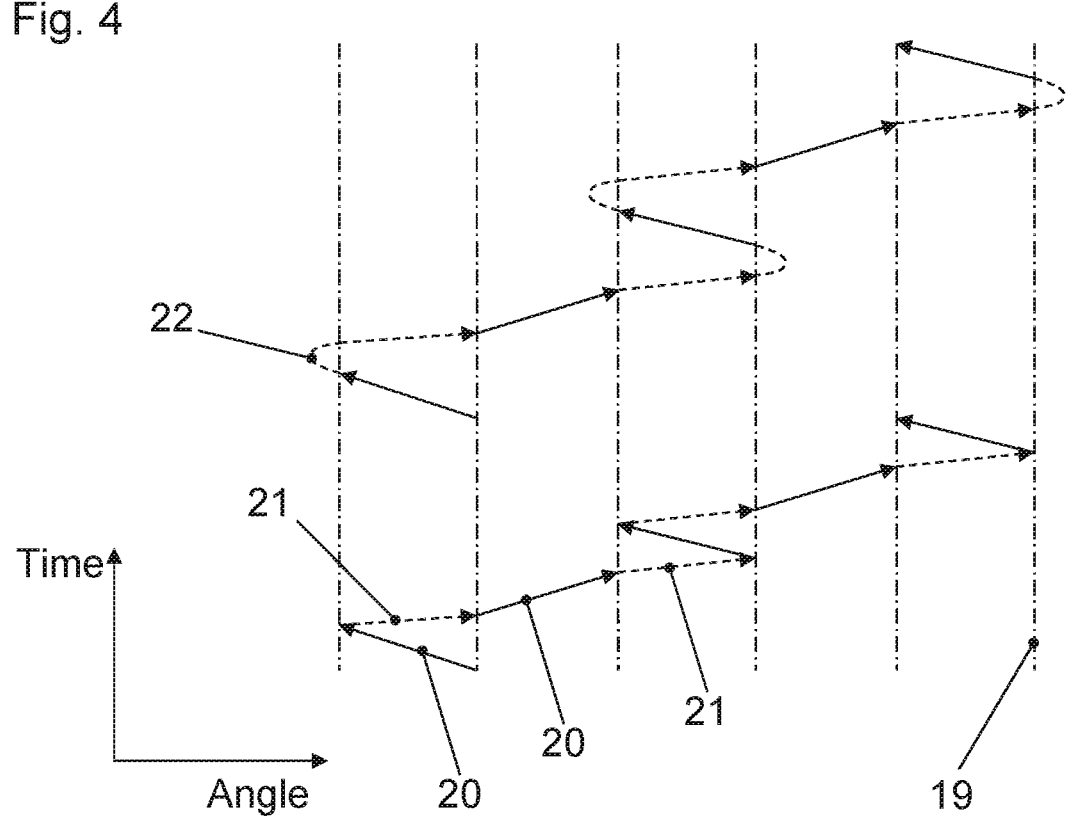

APPARATUS FOR DEFLECTING A LASER RADIATION OR FOR DEFLECTING LIGHT

CROSS REFERENCE TO RELATED APPLICATIONS

This application is a continuation of International Application No. PCT/EP2017/067934, filed on Jul. 14, 2017, which claims priority under 35 U.S.C. § 119 to Application No. DE 102016113978.5 filed on Jul. 28, 2016, the entire contents of which are hereby incorporated by reference.

TECHNICAL FIELD

The disclosure relates to: an apparatus for deflecting laser radiation, in particular, for an SLS or an SLM method or a laser TV method; an apparatus for deflecting light, in particular, for a Lidar or a Ladar method or for a scanning observation method or a tracking method; as well as an apparatus for carrying out an SLS or an SLM method or another scanning method, comprising such an apparatus for deflecting a laser radiation or light.

BACKGROUND

In SLS methods or, more specifically, in selective laser sintering and in SLM methods or, more specifically, in selective laser melting, scanning apparatuses with galvanic mirrors are used in the prior art in order to enable a rapid movement of a focal region of a laser radiation across a working plane, in which a metal powder or a polymer powder is located. The resulting scan speed is approximately a few meters per second.

The systems employed for the aforementioned methods must continue to be able to allow the focal regions in the working plane to jump quickly from a first region to a second region that is at a distance from the first region. This is true, because, for example, the region that is heated by the laser radiation needs time to cool down; and because heat diffusion is to be prevented. If the laser treatment were to be carried out, for example, by a focal region moving continuously across the working plane, the result could be uneven heating of the surface area, because the heat transfer depends, for example, on the shape of the cross section of the region to be heated.

Therefore, it has to be possible to move very quickly and accelerate very rapidly the mirrors used in the prior art. However, in order to meet such a requirement, the size and the weight of the mirrors would have to be limited and, as a result, the magnitude of the damage threshold of the mirrors is limited or, more specifically, the power of the laser that is used is limited.

In other scanning methods, in which the laser radiation or light is generally deflected, such as, for example, in a laser TV, a Lidar or a Ladar system, in the case of scanning observation and tracking cameras, it is also desirable to be able to carry out fast movements of focal regions in a working plane.

SUMMARY

The problem, on which the present disclosure is based, is the provision of an apparatus of the type that is mentioned in the introduction and with which fast movements and/or rapid jumps of focal regions in a working plane are made possible, wherein, in particular, high laser powers can be used. Furthermore, the objective is to provide an apparatus for carrying out an SLS or an SLM method or any other scanning method of the type mentioned in the introduction of the specification.

According to an example implementation, an apparatus for deflecting laser radiation comprises: a first lens array having a plurality of lenses that are arranged next to one another and through which the laser radiation passes at least partially, when the apparatus is in operation; a second lens array having a plurality of lenses, which are arranged next to one another, the second lens array being arranged in the apparatus such that when the apparatus is in operation, the laser radiation, which has passed through the first lens array, passes at least partially through the second lens array; a movable, in particular, rotatable or pivotable, first mirror, which is arranged between the two lens arrays and deflects the laser radiation, which has passed through the first lens array, in the direction of the second lens array, when the apparatus is in operation; and an objective lens that focuses the laser radiation, which has passed through the second lens array, into a working plane, when the apparatus is in operation.

As a result of such a design, it is possible to enable a high speed of a focal region in the working plane with simultaneously high laser power. In addition, it is possible to enable rapid jumps of the focal region from a first region to a second region that is at a distance from the first region. For example, with the described apparatus, it is possible to achieve scan speeds in the working plane that are ten times higher without thereby increasing the angular velocity of the mirrors or changing the focal length of the objective lens.

It may be provided that the apparatus comprises a second movable, in particular, rotatable or pivotable, mirror that deflects the laser radiation, which has passed through the second lens array, preferably in the direction of the objective lens, when the apparatus is in operation.

There is the option that the apparatus comprises a first lens device that is arranged between the first lens array and the first mirror, wherein the first lens device is designed in particular, as a converging lens, preferably as a spherical converging lens. Furthermore, the apparatus may comprise a second lens device that is arranged between the first mirror and the second lens array, wherein the second lens device is designed, in particular, as a converging lens, preferably as a spherical converging lens.

In this case, the first lens device and/or the second lens device may be arranged in the apparatus, in particular, such that they image the output-sided focal plane of the first lens array into the input-sided focal plane of the second lens array. In this way, the speed at which the deflection angle is changed or, more specifically, at which the focal region is moved in the working plane, is significantly increased compared to the systems in accordance with the prior art. In particular, the speed can be increased, compared to existing systems, by a factor corresponding to the quotient of the focal length of the lens device and the focal length of the lenses of the lens array. This quotient may well be several dozen, thus, for example, may be between 10 and 30. Furthermore, as a result of the diffraction effects or, more specifically, diffractive effects on the second lens array, the intensity of a focal region in the working plane may become weaker in a region corresponding to a first order of diffraction, until the intensity is equal to zero, and may become stronger in a second region that is at a distance from the first region and corresponds to a second order of diffraction, until the intensity reaches a maximum. During this transition, in particular, the space, located between the first and the second region, is not exposed to laser radiation. This results in a process that is comparable or corresponds to the fast jumps from the prior art.

It can be provided that the first lens device and/or the second lens device are arranged in the apparatus such that they Fourier-transform the laser radiation to be deflected, when the apparatus is in operation.

In this case, the first mirror can be arranged in or in the region of the output-sided Fourier plane of the first lens device and in or in the region of the input-sided Fourier plane of the second lens device. Furthermore, the output-sided focal plane of the first lens array can correspond to the input-sided Fourier plane of the first lens device or can be arranged in the region of the input-sided Fourier plane of the first lens device. In addition, the input-sided focal plane of the second lens array can correspond to the output-sided Fourier plane of the second lens device or can be arranged in the region of the output-sided Fourier plane of the second lens device.

There is the option that the apparatus comprises a third lens array having a plurality of lenses, which are arranged next to one another, the third lens array being arranged in the apparatus such that, when the apparatus is in operation, the laser radiation, which has passed through the first lens array, passes at least partially through the third lens array; and the laser radiation, which has passed through the third lens array, passes at least partially through the second lens array. Owing to the third lens array, which is arranged, in particular, in the input-sided focal plane of the second lens array, it can be ensured that partial beams of the laser radiation that are present in the region of the third lens array only enter in each case into a lens of the second lens array. As a result, losses are minimized.

It can be provided that the apparatus comprises a controller that move the first mirror at a first speed, in particular, rotate or pivot the first mirror at a first angular velocity, when the apparatus is in operation, and move the second mirror at a second speed, in particular, rotate or pivot the second mirror at a second angular velocity, wherein preferably the first and the second speed, in particular, the first and the second angular velocity, are different. In this way, it can be achieved that, in spite of the described transitions of the focal regions between regions that correspond to different orders of diffraction, the regions of the working plane that are located between the regions, which are initially subjected to laser radiation, are also gradually exposed to laser radiation.

According to one example implementation, the apparatus for deflecting light comprises: a first lens array having a plurality of lenses arranged next to one another; a second lens array having a plurality of lenses arranged next to one another; a movable, in particular, rotatable or pivotable, first mirror, arranged between the two lens arrays in the beam path of the light; and an objective lens arranged on the side of the second lens array that faces away from the first mirror.

The apparatus may deflect light, instead of laser radiation, when the apparatus is used for a scanning observation method or a tracking method. In this case, for example, a photodetector can be arranged in front of the first lens array. However, the apparatus can also deflect light formed as laser radiation when the apparatus is used for a Lidar or a Ladar method.

According to one option, the apparatus carries out an SLS or an SLM method or any other scanning method.

BRIEF DESCRIPTION OF THE DRAWINGS

Other features and advantages of the described apparatus will become apparent from the following description of example implementations with reference to the accompanying drawings.

FIG. 4 shows in schematic form a movement of the focal region of the laser radiation, deflected with the apparatus according to FIG. 1 or FIG. 3, in a working plane, where the movement is different from that shown in FIG. 2.

DETAILED DESCRIPTION

Figure 1:
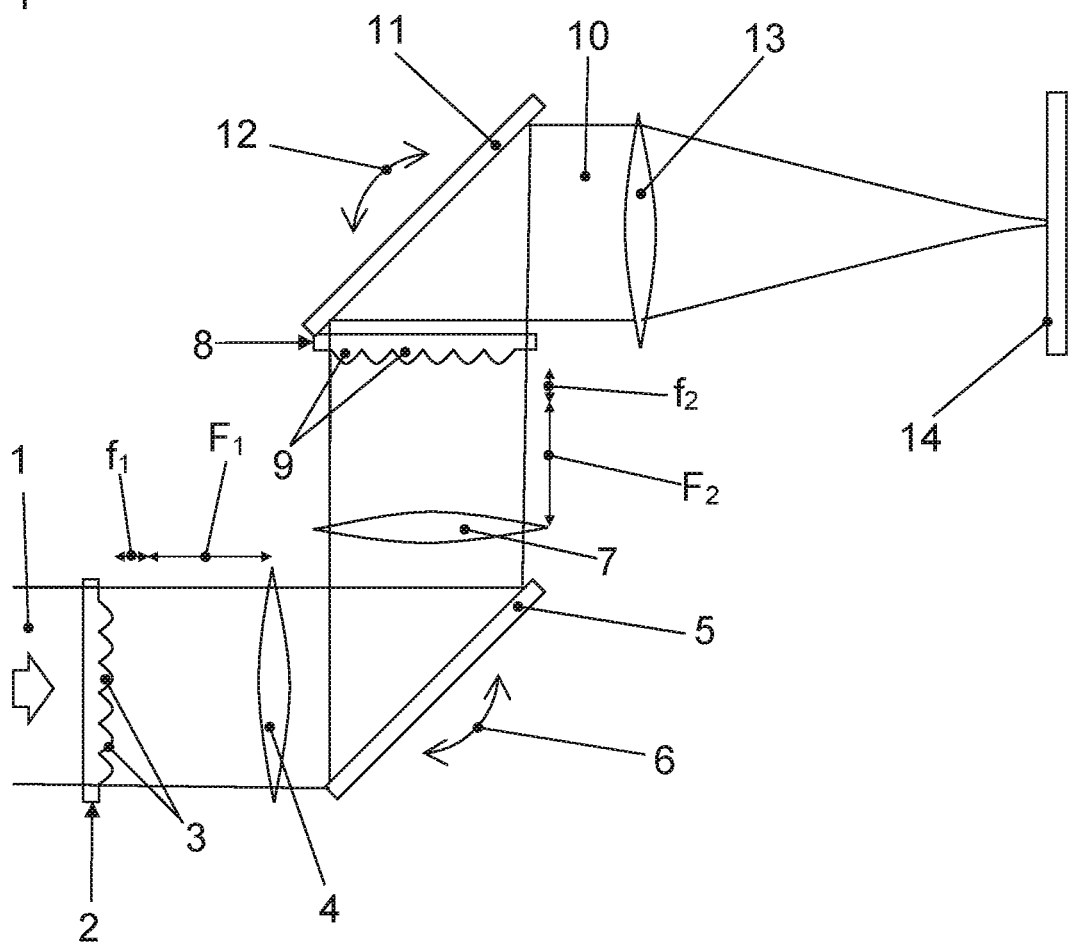
FIG. 1 shows in schematic form a view of an example implementation of an apparatus for deflecting a laser radiation or light.

Identical or functionally identical parts are provided with the same reference numerals in the figures.

An implementation of an apparatus, which is shown in FIG. 1 and is intended for deflecting laser radiation 1, comprises a first lens array 2 that has a plurality of lenses 3 arranged next to one another.

These lenses 3 may be cylindrical lenses arranged next to one another; and the cylinder axes of these lenses may be aligned perpendicular to the direction, in which the lenses 3 are arranged next to one another. The cylindrical lenses can be designed as biconvex or plano-convex lenses. It is also possible to use spherical lenses instead of the cylindrical lenses.

A first lens device 4, which is used as a Fourier transformation element, is arranged in the direction of propagation of the laser radiation behind the first lens array 2. This first lens device 4 is designed as a spherical biconvex lens in the example implementation shown. Other configurations of the first lens device 4 are perfectly conceivable.

The distance between the focal plane of the lenses 3 of the first lens array 2 and the first lens device 4, which is used as the Fourier transformation element, corresponds to the focal length $F_1$ of the first lens device 4. Thus, the distance between the first lens array 2 and the first lens device 4 is $F_1+f_1$, where $f_1$ is the focal length of the lenses 3 of the first lens array 2.

The laser radiation, impinging on the apparatus from the left in FIG. 1, is provided with the reference numeral 1. This laser radiation 1 can be formed, for example, as a flat wave that impinges on the first lens array 2 exactly from the left in FIG. 1 or, more specifically, parallel to the optical axis of the lens array 2. After passing through the first lens array 2 in the focal plane of the lenses 3, the laser radiation 1 is split into a plurality of mutually spaced partial beams, which have beam waists in the focal plane of the lenses 3.

The apparatus also comprises a movable, in particular, rotatable or pivotable, first mirror 5. The mirror 5 is movable or pivotable about an axis that extends into the plane of the drawing of FIG. 1. This aspect is indicated by the arrow 6.

The first mirror 5 is arranged in the region of the output-sided focal plane of the first lens device 4 that is used as a Fourier transformation element. The partial beams of the laser radiation that are generated by the lenses 3 of the first lens array 2 are reflected upwards by the first mirror 5 in FIG. 1.

The apparatus also comprises a second lens device 7 that is used as a Fourier transformation element, where in this case the first mirror 5 is arranged in the region of the input-sided Fourier plane of the second lens device 7. This second lens device 7 is also designed as a spherical biconvex lens in the example implementation shown. Other configurations of the second lens device 7 are perfectly conceivable.

For example, it is possible to design the first lens device 4 and/or the second lens device 7 not as individual biconvex lenses, but rather as a plurality of lenses. For example, it is possible to use in each case two lenses that are arranged closely behind one another in the direction of propagation of the laser radiation.

Furthermore, the apparatus comprises a second lens array 8 that has a plurality of lenses 9 that are arranged next to one another.

These lenses 9 may be cylindrical lenses arranged next to one another, and the cylinder axes of these lenses may be aligned perpendicular to the direction, in which the lenses 9 are arranged next to one another. The cylindrical lenses can be designed as biconvex or plano-convex lenses. It is also possible to use spherical lenses instead of the cylindrical lenses.

The distance between the input-sided focal plane of the lenses 9 of the second lens array 8 and the second lens device 7, which is used as the Fourier transformation element, corresponds to the focal length $F_2$ of the second lens device 7. Therefore, the distance between the second lens array 8 and the second lens device 7 is $F_2+f_2$, where $f_2$ is the focal length of the lenses 9 of the second lens array 8.

The two-dimensional intensity distribution of the laser radiation 1 to be deflected in the input-sided focal plane of the first lens device 4 is Fourier-transformed by the first lens device 4. The input-sided focal plane of the first lens device 4 may also be regarded as an object plane; and the intensity distribution in this object plane may be regarded as an object. The Fourier transformation of the input-sided intensity distribution occurs in the output-sided focal plane of the first lens device 4. This output-sided focal plane corresponds to the Fourier plane of the first lens device 4 that acts as a Fourier transformation element. The spatial intensity distribution in the input-sided focal plane of the first lens device 4 is converted into an angular distribution in the Fourier plane by the first lens device 4. This means that in the Fourier plane, those partial beams, which have the same angle in the input-sided focal plane or object plane, meet at the same location in the Fourier plane.

The Fourier transformation of the object present in the Fourier plane is Fourier-transformed once more by the second lens device 7, so that the twice-Fourier-transformed object and, thus, a two-dimensional intensity distribution, which can represent an image of the object, is present in the output-sided focal plane of the second lens device 7. As a result, the output-sided focal plane of the second lens device 7 can also be referred to as the image plane, in which an image of the beam waists, which are arranged next to one another, is generated. These beam waists are present in the output-sided focal plane of the lenses 3 of the first lens array 2.

In this case, the focal lengths $F_1$ and $F_2$ of the lens devices 4, 7 may be the same or different from each other. The lens devices 4, 7 form a telescope that exhibits a magnification having a factor of 1, when the focal lengths $F_1$ and $F_2$ are the same. If the focal lengths $F_1$ and $F_2$ of the lens devices 4, 7 are different, the result is a correspondingly enlarged or reduced image in the output-sided focal plane of the second lens device 7.

As a result of the imaging, beam waists of partial beams of the laser radiation 1 are generated in the input-sided focal plane of the second lens array 8, where the beam waists are arranged next to one another. These partial beams pass through the lenses 9 of the lens array 8 and emerge from the lenses as collimated beams having a transverse dimension that corresponds to the transverse dimension of the lenses 9. The partial beams, emerging from all of the lenses 9, form a common collimated laser radiation 10 with a common uninterrupted wave front at the output of the second lens array 8.

If the telescope that is formed by the lens devices 4, 7 has the magnification 1, then the diameter of the laser radiation 10, emerging from the second lens array 8, is equal to the diameter of the laser radiation 1 entering the first lens array 2. This is true, especially if the focal lengths f1 of the lenses 3 of the first lens array 2 are equal to the focal length $f_2$ of the lenses 9 of the second lens array 8, and the lateral extents of the lenses 3 of the first lens array 2 are equal to the lateral extents of the lenses 9 of the second lens array 8.

By pivoting or rotating the first mirror 5, the beam waists, imaged in the input-sided focal plane of the second lens array 8, are shifted, in particular, to the left or to the right in FIG. 1 or, more specifically, in the direction, in which the lenses 9 are arranged next to one another. The result of this shift in the input-sided focal plane is a deflection of the individual partial beams after the partial beams have passed through the lenses 9 of the lens array 8. In this case the deflection angle corresponds roughly to the quotient of the shift in the transverse direction of the focal plane and the focal length $f_2$ of the lenses 9.

When partial beams are deflected or, more specifically, tilted to the optical axis of the second lens array 8 at the output of the second lens array 8, these partial beams do not form a common continuous laser radiation 10 in each case or, more specifically, not at each deflection angle. The reason for this lies in the fact that each of the individual partial beams has its own phase shift.

Only at certain deflection angles, which correspond to the diffraction maxima of the grid or lattice formed by the lenses 9, is a common continuous laser radiation 10 generated by the deflected partial beams. At these deflection angles, which correspond to the diffraction maxima, the phase shift between adjacent partial beams corresponds to the wavelength or an integral multiple of the wavelength of the laser radiation.

Through successive pivoting or rotation of the first mirror 5, one of the orders of diffraction becomes weaker, while at the same time the adjacent order of diffraction becomes stronger. This means that, owing to the movement of the first mirror 5, energy is transferred from one order of diffraction to the adjacent order of diffraction. When the intensity of one order of diffraction has reached its maximum, the intensity of the preceding or, more specifically, the adjacent order is equal to zero. Upon further pivoting or rotation of the mirror 5, the intensity of the order that exhibits just barely the maximum intensity will decrease and at the same time the intensity of the next order of diffraction will increase.

Therefore, as a result of a continuous pivoting or rotation of the first mirror 5, the intensity of the laser radiation is continuously increased and reduced or, more specifically, switched on and off, in succession in directions, which are spaced apart at equal angular distances.

Furthermore, the apparatus comprises a movable, in particular, rotatable or pivotable, second mirror 11. The mirror 11 is movable or pivotable about an axis that extends into the plane of the drawing of FIG. 1. This aspect is indicated by the arrow 12. The second mirror 11 reflects the laser radiation 10, emerging from the second lens array 8, to the right in FIG. 1.

Furthermore, the apparatus comprises an objective lens 13, in particular, a focusing objective lens or an F-theta objective lens. The laser radiation 10, emerging from the second lens array 8 and reflected by the mirror 11, passes through this objective lens 13. The focal regions 15a, 15b, 15c, 15d, 15e, 15f, 15g are generated by the objective lens 13 in a working plane 14 (see FIG. 2).

Figure 2:
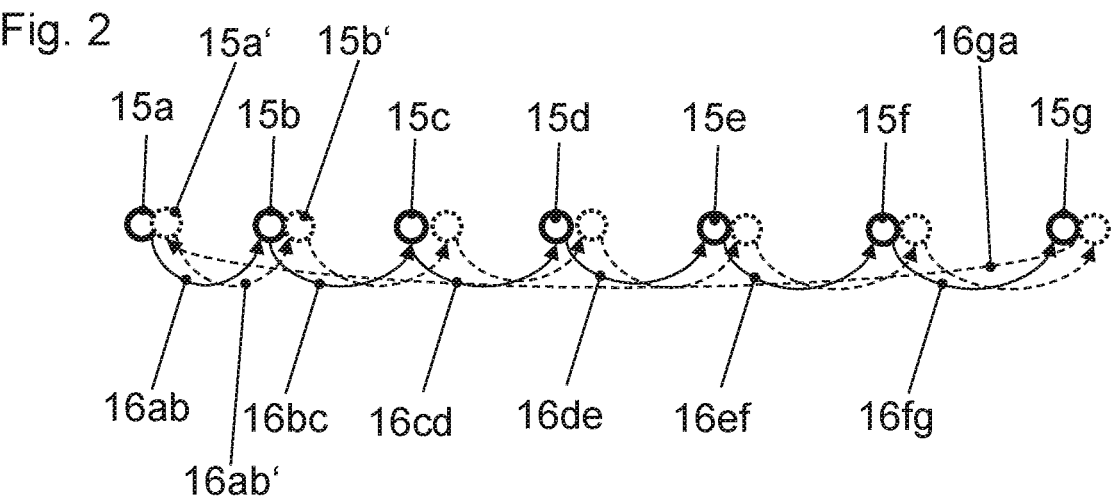
FIG. 2 shows in schematic form a movement of the focal region of the laser radiation, deflected with the apparatus according to FIG. 1 or FIG. 3, in a working plane.

The individual focal regions 15a, 15b, 15c, 15d, 15e, 15f, 15g, which are spaced equidistant from one another, as shown in FIG. 2, correspond to the individual orders of diffraction that increase and decrease again in intensity one after another as a result of continuous pivoting or rotation of the first mirror 5. By use of the objective lens 13, the laser radiations, which are of different orders and emerge from the lens array 8 in various directions, are focused into the focal regions 15a, 15b, 15c, 15d, 15e, 15f, 15g, which are spaced equidistant from one another.

There may be more or fewer orders or, more specifically, more or fewer focal regions 15a, 15b, 15c, 15d, 15e, 15f, 15g than those shown in FIG. 2.

When a first of the orders is focused into a first focal region 15a, then as a result of the continuous pivoting or rotation of the first mirror 5, the intensity of this first focal region 15a will decrease; and at the same time the intensity of the adjacent second focal region 15b will increase until it reaches the maximum intensity. This aspect is shown by the arrow 16ab in FIG. 2. The same occurs between focal regions 15b and 15c as shown by arrow 16bc, between focal regions 15c and 15d as shown by arrow 16cd, between focal regions 15d and 15e as shown by 16de, between focal regions 15e and 15f as shown by arrow 16ef and between focal regions 15f and 15g as shown by arrow 16fg.

Thus, the focal region 15a is not scanned over the working plane 14, in order to pass into the focal region 15b. Instead, the focal region 15a slowly extinguishes, while the focal region 15b gains in intensity. The space of the working plane 14 that lies between these two focal regions 15a, 15b is not subjected to laser radiation during the transition from the focal region 15a to the focal region 15b.

In this way the intensities of the individual focal regions 15a, 15b, 15c, 15d, 15e, 15f, 15g increase in succession and then decrease again to the benefit of the adjacent focal region. After the last focal region 15g has exceeded its intensity maximum, the intensity of the last focal region decreases to the benefit of the first focal region 15a due to a suitable design of the preferably continuous movement, in particular, the rotation or pivoting, of the first mirror 5. This aspect is shown by the arrow 16ga in FIG. 2.

However, the pivoting or, more specifically, the rotating of the first mirror 5 is superimposed by a pivoting or, more specifically, rotation of the second mirror 11. In the time in which the first mirror has exposed all of the focal regions 15a, 15b, 15c, 15d, 15e, 15f, 15g once in succession to laser radiation, the second mirror is continuously pivoted or rotated such that as the intensity of the first focal region 15a increases again, this focal region is shifted slightly to the right in FIG. 2. This aspect is indicated by the dotted focal region 15a'. In the time ti the second mirror 11 moves the laser radiation 10 in the working plane 14 to the right by a distance that corresponds approximately to the extent of one of the focal regions 15a, 15b, 15c, 15d, 15e, 15f, 15g.

As the intensity of the first focal region 15a' of the second pass of the laser radiation becomes weaker, the intensity of the second focal region 15b' of the second pass becomes simultaneously greater (see in this respect the arrow 16ab'), so that the process described above is repeated. Therefore, the spaces between the focal regions 15a, 15b, 15c, 15d, 15e, 15f, 15g that are acted upon in the first pass are also exposed progressively to laser radiation. In FIG. 2 only two passes are shown for the sake of maintaining clarity.

In this way the focal region of the laser radiation 10 can act relatively quickly on different regions of the working plane by two mirrors 5, 11 that are moving comparatively slowly.

The movement of the beam waists of the partial beams in the input-sided focal plane of the second lens array 8 may be problematic in the implementation shown in FIG. 1. This is especially true if the beam waists are shifted significantly out of the middle. This aspect can lead to the partial beams impinging not only on one lens 9, but also on several lenses 9. Such a situation would result is undesired power losses.

Figure 3:
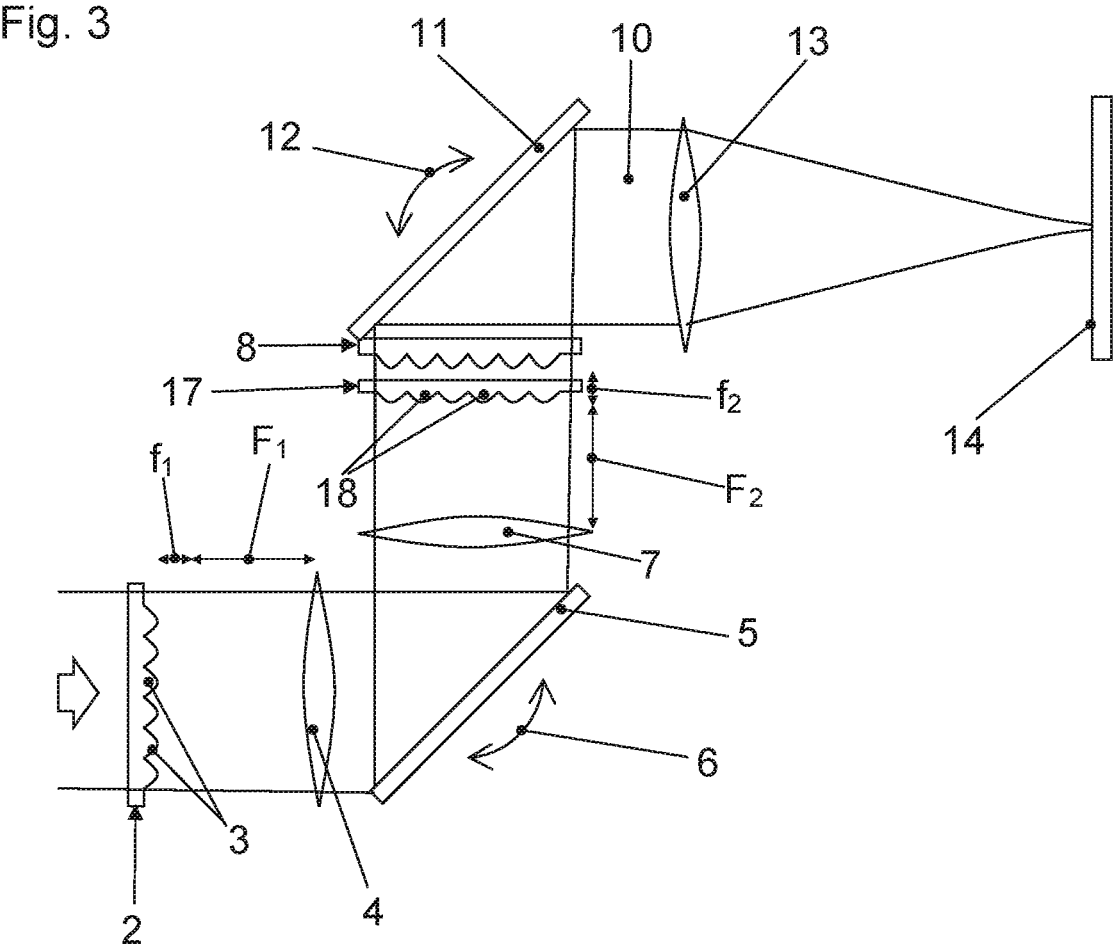
FIG. 3 shows in schematic form a view of a modified implementation of the apparatus of FIG. 1.

A modified implementation, shown in FIG. 3, takes this problem into account. This implementation differs from that shown in FIG. 1 in that the apparatus shown in FIG. 3 comprises additionally a third lens array 17 that has a plurality of lenses 18 arranged next to one another.

These lenses 18 may be cylindrical lenses that are arranged next to each other, and the cylinder axes of these lenses can be aligned perpendicular to the direction, in which the lenses 18 are arranged next to one another. The cylindrical lenses may be designed as biconvex or plano-convex lenses. It is also possible to use spherical lenses instead of the cylindrical lenses.

The third lens array 17 is arranged in the input-sided focal plane of the second lens array 8 and, thus, exactly where the beam waists of the partial beams are imaged. The lenses 18 of the third lens array 17 act at this position as field lenses, which shape the partial beams such that in each case one of the partial beams impinges exactly on one of the lenses 9 of the second lens array 8. As a result, the probability of the aforementioned power losses is significantly reduced.

The apparatuses shown in FIGS. 1 and 3 make it also possible to carry out rapid and more continuous scanning movements of focal regions in a working plane 14 when the mirrors 5, 11 are driven in a suitable manner. Such scanning movements that are at least partially continuous are useful for methods, which are different from an SLS or an SLM method, and which are intended for deflecting laser radiation or alternatively light, such as, for example, a laser television, a Lidar or a Ladar system, or for scanning observation and tracking cameras.

Corresponding movements of focal regions in the working plane 14 are shown in FIG. 4, where the scanning angle is plotted from left to right; and the time is plotted from bottom to top in arbitrary units. The dotted-dashed lines, which are provided with the reference numeral 19, illustrate the different orders of diffraction that are traversed by pivoting or rotating the first mirror 5.

In the case of the movement shown in FIG. 4, the second mirror 11 performs comparatively fast movements, whereas the first mirror 5 performs comparatively slow movements. In this respect the second mirror 11 scans in each case in one direction over an angular range that corresponds to the distance between two orders of diffraction 19. The angles, through which the deflected laser radiation passes as a result of the pivoting or rotating of the second mirror 11, are indicated by solid arrows 20 in FIG. 4.

After passing through the angular range between two orders of diffraction 19, the second mirror 11 decelerates and accelerates in the opposite direction. During this deceleration and acceleration operation the laser light source or, in the case of a scanning camera, a photodetector, arranged in place of the laser light source, can be switched off.

Furthermore, during the deceleration and acceleration operation a movement of the first mirror 5 takes place such that a transition is made from one order of diffraction 19 to the next order of diffraction 19. This transition from one order of diffraction 19 to the next is indicated by the dashed arrows 21 in FIG. 4.

After this transition to the next order of diffraction, the movement of the second mirror 11 in the opposite direction takes place in turn over an angular range that corresponds to the distance between two adjacent orders of diffraction. As a result of combining the movements of the two mirrors in this way, a large scanning region can be largely covered continuously in a working plane.

It should be noted that for the second pass of the scanning region, shown in FIG. 4 at the top, the deceleration and acceleration operations of the second mirror 11 are indicated by the curved dashed arrows 22.

What is claimed is:

1. An apparatus for deflecting laser radiation, comprising:
   a first lens array comprising a plurality of first lenses arranged next to one another to permit the laser radiation to at least partially pass through the first lens array, the first lenses being arranged side by side in a direction that is perpendicular to a direction of propagation of the laser radiation passing through the first lenses;
   a second lens array comprising a plurality of second lenses arranged next to one another to at least partially pass through the second lens array laser radiation that has passed through the first lens array, the second lenses being arranged side by side in a direction that is perpendicular to a direction of propagation of the laser radiation passing through the second lenses;
   a first rotatable or pivotable mirror arranged between the first and second lens arrays to deflect in a direction of the second lens array the laser radiation that has passed through the first lens array, the first rotatable or pivotable mirror being rotatable or pivotable about a first axis;
   an objective lens to focus laser radiation that has passed through the second lens array into a working plane;
   a second rotatable or pivotable mirror to deflect in a direction of the objective lens the laser radiation that has passed through the second lens array, the second rotatable or pivotable mirror being rotatable or pivotable about a second axis that is parallel to the first axis; and
   a first lens device arranged between the first lens array and the first rotatable or pivotable mirror and a second lens device arranged between the first rotatable or pivotable mirror and the second lens array;
   one or both of the first and second lens devices being arranged to image an output-sided focal plane of the first lens array into an input-sided focal plane of the second lens array, the one or both of the first and second lens devices being arranged to Fourier-transform the laser radiation that has passed through the first lens array;
   the first rotatable or pivotable mirror being arranged in a region of an output-sided Fourier plane of the first lens device and in a region of an input-sided Fourier plane of the second lens device.

2. The apparatus of claim 1, wherein:
   the output-sided focal plane of the first lens array corresponds to an input-sided Fourier plane of the first lens device or is arranged in a region of the input-sided Fourier plane of the first lens device; and/or
   the input-sided focal plane of the second lens array corresponds to an output-sided Fourier plane of the second lens device or is arranged in a region of the output-sided Fourier plane of the second lens device.

3. An apparatus for deflecting laser radiation, comprising:
   a first lens array comprising a plurality of first lenses arranged next to one another to permit the laser radiation to at least partially pass through the first lens array, the first lenses being arranged side by side in a direction that is perpendicular to a direction of propagation of the laser radiation passing through the first lenses;
   a second lens array comprising a plurality of second lenses arranged next to one another to at least partially pass through the second lens array laser radiation that has passed through the first lens array, the second lenses being arranged side by side in a direction that is perpendicular to a direction of propagation of the laser radiation passing through the second lenses;
   a first rotatable or pivotable mirror arranged between the first and second lens arrays to deflect in a direction of the second lens array the laser radiation that has passed through the first lens array, the first rotatable or pivotable mirror being rotatable or pivotable about a first axis;
   an objective lens to focus laser radiation that has passed through the second lens array into a working plane;
   a second rotatable or pivotable mirror to deflect in a direction of the objective lens the laser radiation that has passed through the second lens array, the second rotatable or pivotable mirror being rotatable or pivotable about a second axis that is parallel to the first axis;
   a first lens device arranged between the first lens array and the first rotatable or pivotable mirror and a second lens device arranged between the first rotatable or pivotable mirror and the second lens array; and
   a controller to rotate or pivot the first rotatable or pivotable mirror at a first angular velocity and to rotate or pivot the second rotatable or pivotable mirror at a second angular velocity that is different from the first angular velocity.

* * * * *